W. S. HARLEY.
TRANSMISSION GEARING FOR MOTOR PROPELLED VEHICLES.
APPLICATION FILED NOV. 18, 1912.
1,094,558.
Patented Apr. 28, 1914.
6 SHEETS—SHEET 3.
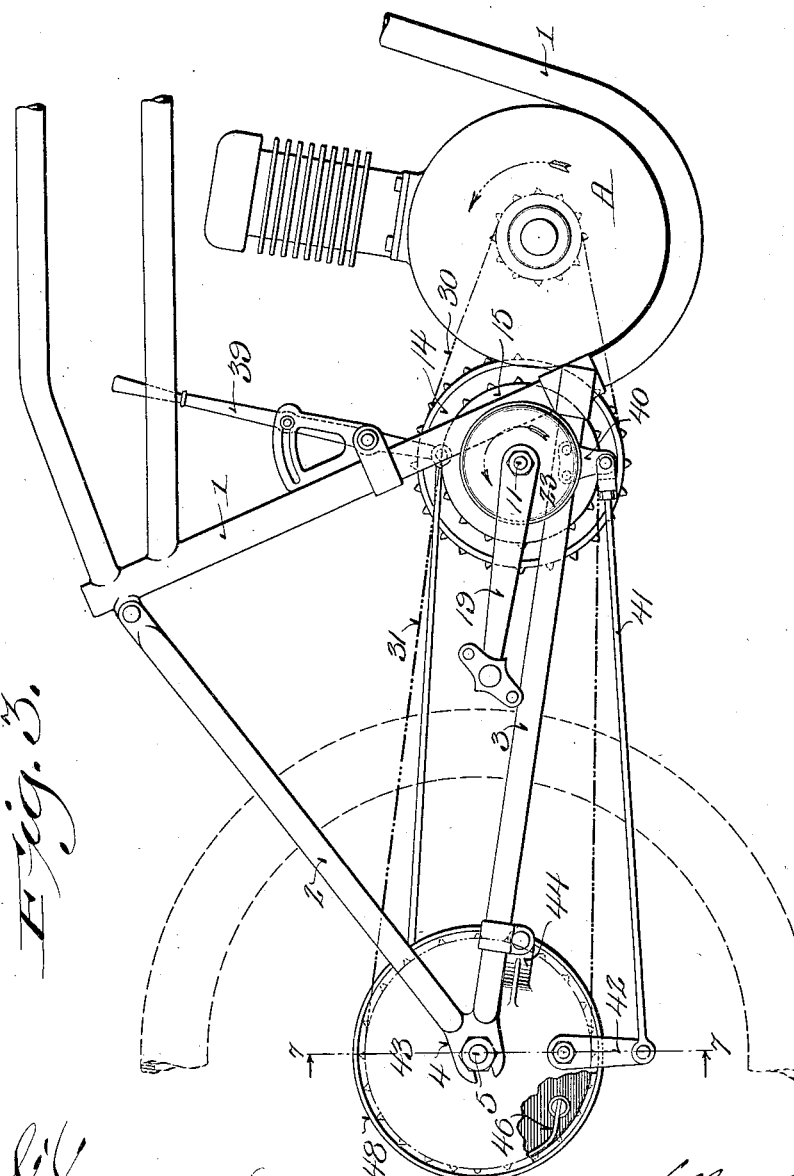

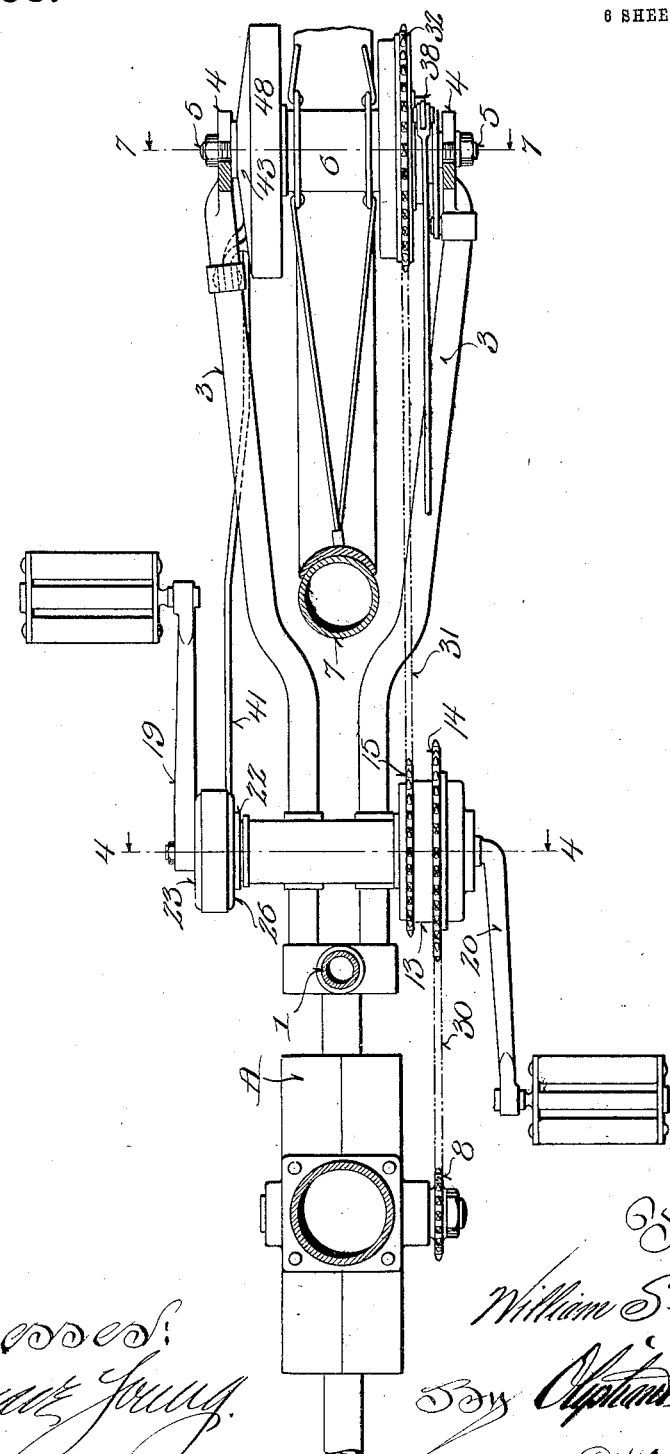

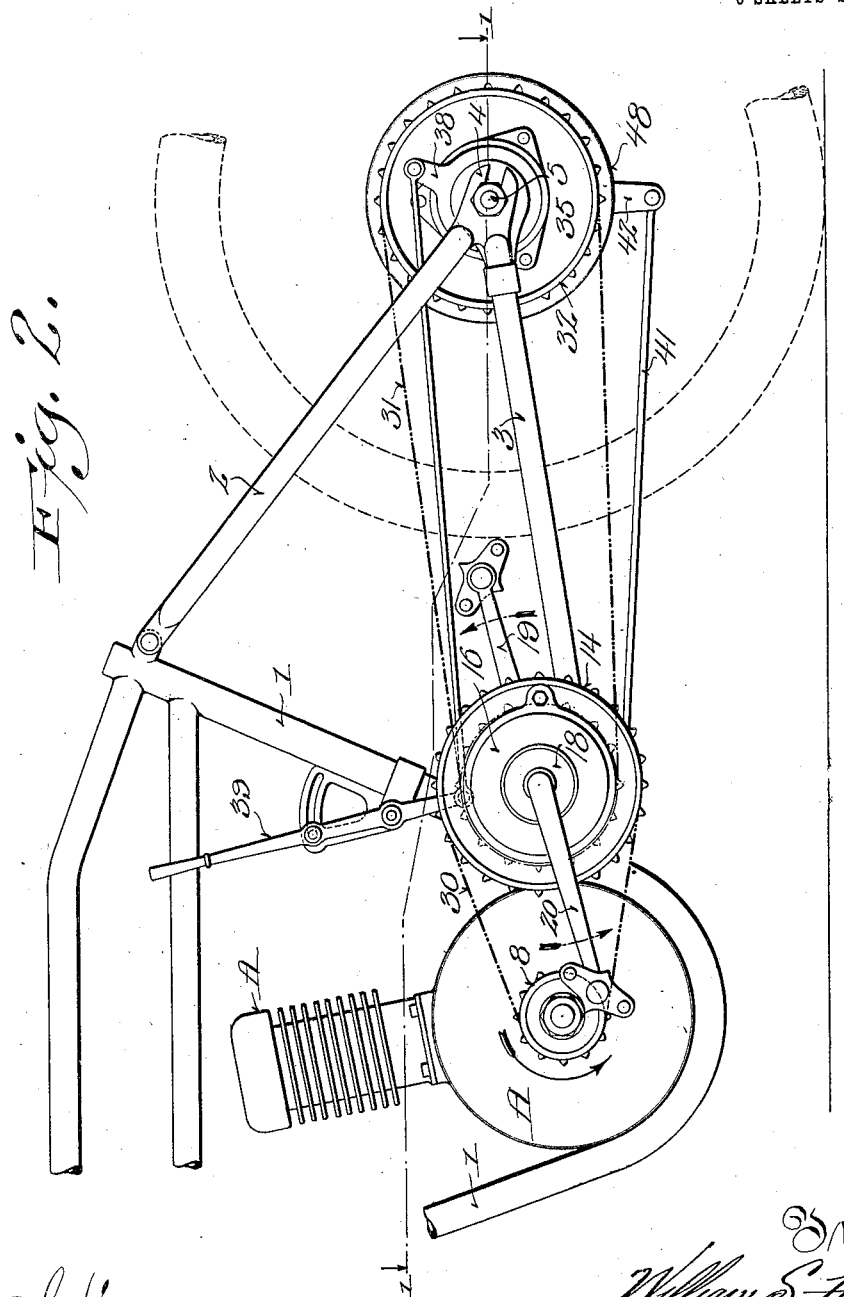

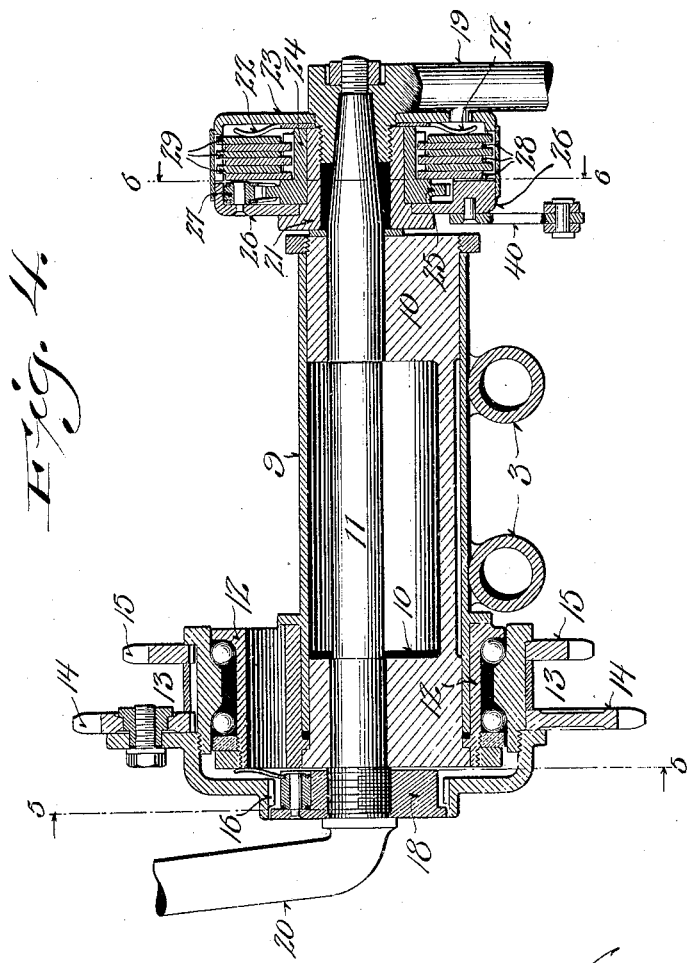

W. S. HARLEY.
TRANSMISSION GEARING FOR MOTOR PROPELLED VEHICLES.
APPLICATION FILED NOV. 18, 1912.

1,094,558.
Patented Apr. 28, 1914.
6 SHEETS—SHEET 5.

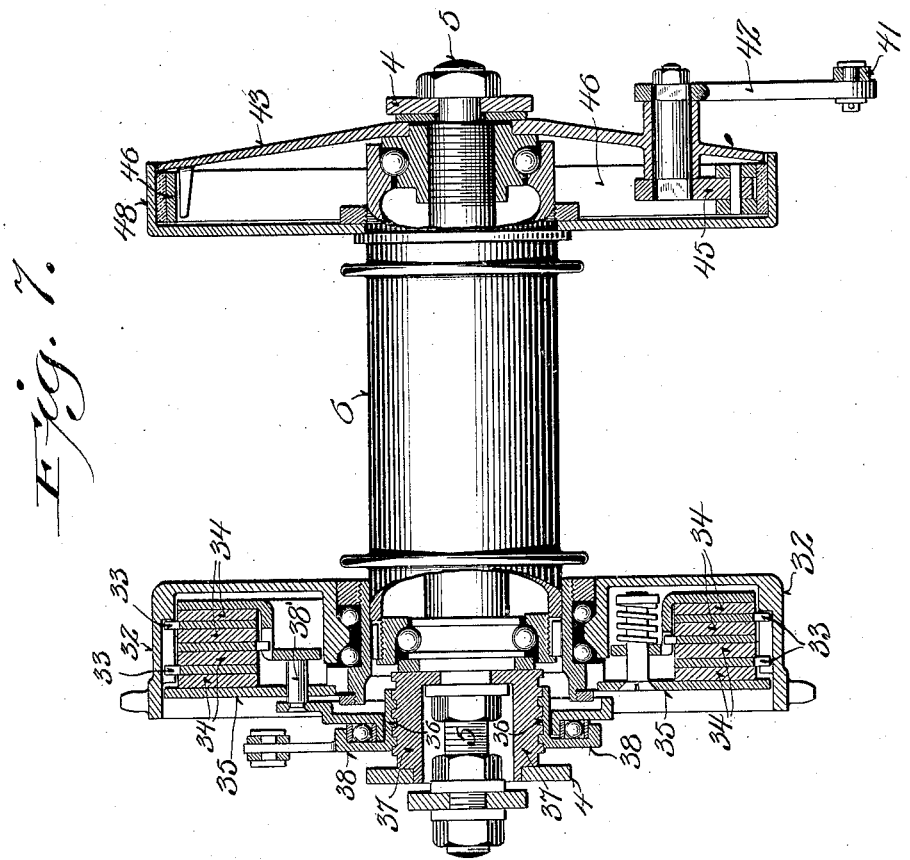

UNITED STATES PATENT OFFICE.

WILLIAM S. HARLEY, OF MILWAUKEE, WISCONSIN.

TRANSMISSION-GEARING FOR MOTOR-PROPELLED VEHICLES.

1,094,558.

Specification of Letters Patent.

Patented Apr. 28, 1914.

Application filed November 18, 1912. Serial No. 732,074.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Transmission-Gearing for Motor-Propelled Vehicles; and I do hereby declare that the following is a full, clear, and exact description thereof.

My invention refers especially to motorcycle driving gear, its primary object being to provide simple, economical and effective means for controlling the application of power from the motor to the driven traction wheel of such vehicles.

Specific objects of my invention are to provide a connection between the pedal-carrying crank-shaft and motor, whereby the latter may be started by movement of said crank-shaft in one direction after a manual operation to free the traction wheel from said motor, the motor being thus started while the vehicle is at rest.

Another object of my invention is to provide means in connection with the crank-shaft for setting a traction-wheel brake by a reverse movement from that effected in a motor-starting operation.

A further object of my invention is to provide means in connection with the pedal-carrying crank-shaft whereby the shock due to reversal from back-firing, incidental to cranking the engine, is for the most part absorbed in a traction-wheel brake mechanism, the unspent energy due to such premature explosion being relieved by a friction clutch mechanism disposed between the aforesaid crank-shaft and brake mechanism.
Hence it will be seen that by employing the usual manually controlled clutch-lever in connection with the rear traction-wheel driving mechanism and the crank-shaft the motor can be started, the traction-wheel freed and brake applied thereto and in addition accidents due to back-firing are eliminated.

With the above and other minor objects in view the invention consists in certain peculiarities of construction and combination of parts as hereinafter set forth with reference to the accompanying drawings and subsequently claimed.

Figure 6:
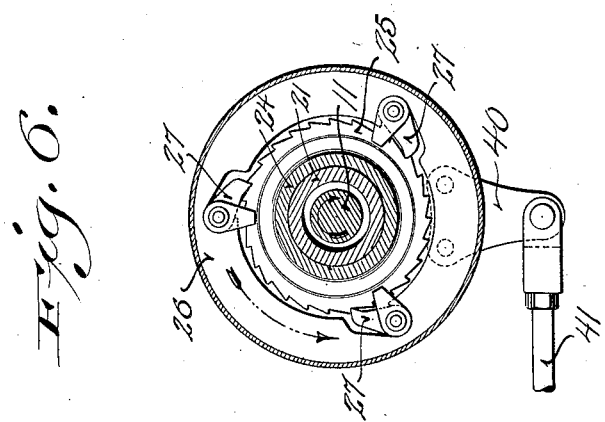
Figure 5:
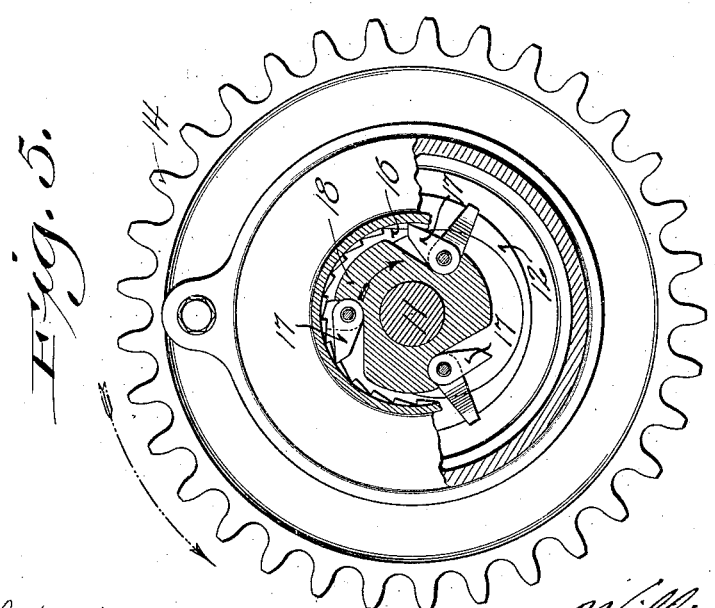

In the drawings Figure 1 represents a sectional plan view of a portion of a motorcycle embodying the features of my invention, the section being indicated by line 1—1 of Fig. 2; Fig. 2, a side elevation of the same looking toward the gear side of said machine; Fig. 3, a similar side elevation looking from the reverse side with parts broken away to illustrate certain structural features; Fig. 4, an enlarged detail sectional view of the pedal-carrying crank-shaft and its connections, the section being indicated by line 4—4 of Fig. 1; Fig. 5, an elevation of the same partly in section as indicated by line 5—5 of Fig. 4; Fig. 6, a cross-section of the crank-shaft mechanism, the section being indicated by line 6—6 of Fig. 4, and Fig. 7, an enlarged detail sectional view of the traction-wheel hub and its connections, the section being indicated by line 7—7 of Fig. 3, with a portion of the hub in full.

Referring by characters to the drawings 1 represents the seat-mast of a motorcycle frame, and 2, 3, respectively, the upper and lower rear fork members which members are connected at the point of intersection by a slotted head 4 that receives a rigid axle 5, the same serving as a support for the hub 6 of a traction-wheel 7 of ordinary construction.

Fixed in a suitable loop extension of the seat-mast is the usual type of motor A, the shaft of which carries a drive-wheel 8 in the form of a sprocket. Brazed or otherwise secured to the lower rear fork member 3 is a tubular hanger 9 having an adjustable eccentric journal block 10 fitted therein for the reception of a crank-shaft 11. The eccentrically arranged journal-block 10 constitutes no part of my present invention and is provided for the purpose of adjusting tension of the power transmission belts to be hereinafter described, the said belt tightener mechanism being fully set forth in an application for patent filed by me July 13, 1912, for improvements in transmission gearing, Serial Number 709,160. In brief, as shown, the above described belt tightener mechanism embodies an eccentric bearing-collar 12, the hub of which is rotatorily adjustable about one end of the tubular hanger, the eccentric journal-block being similarly adjusted within the latter, whereby after a belt-tightening operation the collar and crank-shaft are concentrically alined. The face of the bearing-collar 12 has mounted thereon the hub of a double-faced power transmission wheel 13, which wheel is shown in the form of a stepped sprocket having toothed faces 14 and 15, which wheel under normal running conditions must revolve concentric with the crank-shaft. Carried by the transmission-wheel 13 is a hub member in the form of an internally ratchet-toothed wheel 16, which wheel is adapted to be engaged by pawls 17 that are pivoted to a collar 18, the same being rigidly secured to the crank-shaft. These pawls carry spring-metal tails that are in frictional engagement with one face of the non-rotatory bearing collar 12, and hence when the shaft is rotated in the same direction as the working faces of the pawls are extended their tail engagement will cause them to recede radially and revolve clear of the ratchet-teeth of wheel 15, the direction of rotation being indicated by the full line arrow in Fig. 5. Hence when the crank-shaft is revolved in the above indicated direction the pawls are free to revolve clear of the ratchet-wheel teeth, whereby rattle and its consequent wear is avoided. The above described movement is effected in a back-pedaling operation and should the crank-shaft be revolved in a reverse direction as indicated by the dotted arrow, it is apparent that the frictional engagement of the tails of the pawls 17 will cause them to expand radially and thus effect a clutching engagement with the ratchet-wheel 16, whereby the transmission wheel 13 will be driven in the same direction as the engine is rotated to effect a starting operation. These details of construction constitute a one-way clutch connection between the crank-shaft and power transmission wheel as clearly shown in Figs. 4 and 5 of the drawings. The opposite end of the crank-shaft 11 is tapered for the reception of an exteriorly threaded hub of a crank-arm 19 that is rigidly secured to the crank-shaft by a nut in threaded union with a reduced end of the same. The corresponding crank-arm 20 at the opposite end of the crank-shaft forms an extension of the latter, it being understood that these cranks carry the usual pedals.

A flanged thimble 21 is rigidly secured to the hub of the crank-arm 19 by threaded engagement therewith, the outer end of said thimble serving to bind and rigidly secure a series of spring fingers 22 and also a housing 23 to said crank-arm hub, whereby all of the parts together with the crank-shaft form a mechanical unit and rotate as such. Loosely mounted upon the thimble is a hub 24 of a ratchet-wheel 25 and also a disk 26, the latter carrying a series of pivoted pawls 27 that are arranged to engage the ratchet-wheel. The pawls 27 are provided with spring-tails that straddle and frictionally engage with the faces of said ratchet-wheel, whereby they are disengaged incidental to rotation of the crank-shaft in the direction of the arrow as indicated in Fig. 6, which direction corresponds to the direction of the dotted arrow in Fig. 5 that is effected in forward pedaling to start the engine. Hence it will be seen that the ratchet-wheel 25 is free to revolve when the intermediate transmission wheel 13 is being rotated and upon a reverse movement of the crank-shaft the said wheel 13 is free to revolve while the ratchet-wheel 26 is engaged.

The hub 24 of the ratchet-wheel 25 carries a series of friction-plates 28 that are intermeshed with a corresponding series of plates 29, which latter are revoluble with the housing 23. The two series of nested plates being under predetermined compression, by the force of the springs 22, thus prevent slippage of the ratchet-wheel under all normal conditions. Hence said ratchet-wheel under such conditions is revoluble with the crank-shaft. The function of these plates is therefore to provide a permanent friction clutch between the crank-shaft and ratchet-wheel, the pawl carrying disk 26 being at all times freely movable, except when its pawls are interlocked with the ratchet-wheel, which action is effected by rotating said wheel in a back pedaling direction indicated by the dotted arrow. The points of the pawls are arranged to engage the ratchet-wheel when the crank-shaft is so revolved, in which instance the double-faced gear-wheel 13 is free. As best shown in Figs. 1 and 2 the motor drive-wheel 8 is connected by a belt 30 to the sprocket-wheel face 14 of the transmission wheel 13, its toothed face 15 being connected by a belt 31 to a traction drive wheel 32 that carries corresponding sprocket-teeth for engagement with the belt and which wheel is loosely mounted upon the hub 6 of the traction wheel 7. As best illustrated in Fig. 7, the traction drive wheel 32 is in this instance arranged to be connected and disconnected from the hub 6 by friction clutch mechanism such as disclosed in a patent issued to me March 12, 1912, No. 1020199, the same comprising a set of friction disks 33 that are carried by the driven wheel 32 and adapted to be engaged by a second set of spring-pressed friction disks 34, which latter are carried by a head 35 that is rigidly secured to the traction wheel hub. The traction drive wheel 32 is locked or unlocked from the hub of the traction-wheel by manipulation of a nut 36, which nut is turned in or out upon a non-rotary threaded block 37, whereby the friction-plates are contracted under spring pressure through the medium of plungers 38, all of which construction forms no part of my present invention. As best shown in Figs. 2 and 7 of the drawings the clutch-nut 36 has an eared flange 38 that is linked to an actuating hand-lever 39, which lever is conveniently positioned and fulcrumed upon a bracket that extends from the seat-mast 1 of the frame.

Referring to Figs. 3 and 4 of the drawings the disk 26 that is revoluble about the pedal-carrying crank-shaft 11, is provided with a projecting ear 40, which ear is connected by a rod 41 to an arm 42 of a braking crank. This braking crank is journaled in a non-rotatory brake-incasing head 43, the same being mounted about the traction-wheel axle 5 and is held fast by a clip 44 that in turn is secured to one of the rear fork members 3. One leg 45 of the braking crank is connected to the free end of a brake-band 46, the opposite end of which band is permanently secured to the casing-head. The outer face of the brake-band 46 is arranged to engage the inner face of a housing shell 48 that is carried by the traction wheel hub 6, all of which construction is clearly illustrated and described in the above referred to patent of March 12, 1912.

While I have shown and described a specific clutch and brake mechanism for controlling the traction wheel and also a specific clutch for effecting engagement between the double face transmission wheel and pedal-carrying crank, it is apparent that I may, without departing from the spirit of my invention, embody various forms of such mechanical devices in carrying out my invention.

From the foregoing description it is apparent that to start the motor the operator pedals the crank-shaft forwardly in the direction of the arrows indicated in Fig. 2, this movement causing clutching engagement between the double-faced transmission wheel 13 and collar 18 of the crank-shaft. Prior to the pedaling operation however it is understood that the operator shifts the actuating lever 39, whereby the nut 36 is rotated to release the friction clutch connection between the traction-wheel hub 6 and traction drive wheel 32 mounted thereon. Hence the machine will remain at a standstill and after the engine is started by the forward pedaling operation its power will immediately be transmitted to the transmission wheel 13 and rear traction drive wheel 32, both of which are now idly rotated and it is understood that the direction of travel of said transmission wheel will cause disengagement with its toothed hub-wheel 16 from the pawl 17, the same being depressed by action of the teeth and held in said depressed position by their frictional engagement with the bearing-collar 12. Should the motor back-fire in a starting operation it is apparent that through its belt connection with the transmission wheel 13 and clutch connection of the latter with the crank-shaft that said shaft would be reversed in its rotation. This reversal will immediately cause the pawls 27 of the braking disk 26 to be thrown into mesh with the ratchet-wheel 25, whereby the said disk will be rocked in the direction as indicated by the dotted arrow in Figs. 6 and 3, thereby the brake mechanism will engage the housing 48 of the hub 6 and thus lock said crank-shaft against further backward movement, which shock will be distributed to the traction-wheel that is now at rest. It is apparent that should the engine continue to rotate in a reverse direction after the brake mechanism has been set that serious damage would occur to the machine. This is avoided by the predeterminedly set clutch mechanism which frictionally locks the ratchet-wheel 25 with the crank-shaft, said mechanism permitting slippage of the locked disk 26 and ratchet-wheel upon the sleeve 21 to thus absorb the overload strain from the motor gradually, whereby the crank-shaft will only revolve slowly and not injure the operator or the machine. After the engine has been started power is applied to the traction wheel through manipulation of the lever 39, whereby the traction drive wheel 32 is positively clutched to the hub 6 of said traction-wheel, this operation being common to a certain type of machines of the described character.

It is apparent that I may, without departing from the spirit of my invention, substitute flat belts and pulley-wheels for the sprockets and chain-belts shown and described.

I claim:

1. In a vehicle of the character described having a frame, a motor, a traction wheel, a traction drive-wheel, a manually controlled clutch mechanism for interlocking the traction drive-wheel and traction-wheel, a traction-wheel brake, and a crank-shaft journaled upon the frame; the combination of a transmission wheel loosely mounted about the crank-shaft, means for locking the transmission wheel to the crank-shaft when the same is rotated in one direction, and belts connecting the said transmission wheel with the motor and traction drive-wheel, a one-way clutch-controlled brake actuating means carried by the crank-shaft and connected to the traction drive-wheel brake, whereby said brake is set when the crank-shaft is rotated in a reverse direction from that aforesaid, and a predeterminedly tensioned means for connecting the one-way clutch-controlled brake-actuating means, whereby said clutch is free to slip under abnormal load strain.

2. In a vehicle of the described character having a frame, a motor, a traction-wheel, a traction drive-wheel therefor, a manually controlled clutch mechanism interposed between the traction-wheel and its traction drive-wheel, a traction drive wheel brake, a pedal-carrying crank-shaft, a clutch-controlled transmission wheel carried by the crank-shaft, and belts connecting the clutch-controlled crank-shaft wheel, motor and traction-drive-wheel; the combination of a disk loosely mounted about the crank-shaft, means connecting the disk and traction-wheel brake mechanism, a clutch-wheel loosely mounted about said crank-shaft, means for locking the clutch-wheel and disk together when the crank-shaft is rotated in one direction, and spring-controlled friction means for holding the clutch-wheel in rotatory engagement with the aforesaid crank-shaft under normal load strain.

3. In a vehicle of the character described having a frame, a motor, a traction wheel, a traction drive-wheel, a manually controlled clutch mechanism for interlocking the traction drive-wheel and traction-wheel, a traction-wheel brake, and a pedal-carrying crank-shaft journaled upon the frame; the combination of a transmission-wheel loosely mounted about the crank-shaft, a belt connection between the transmission-wheel and motor, a belt connection between the transmission-wheel and drive-wheel, and a one-way clutch mechanism carried by the crank-shaft connected to the traction-wheel brake whereby said brake is set when the crank-shaft is rotated in a reverse or rearward direction due to back-fire of the motor.

In testimony that I claim the foregoing I have hereunto set my hand at Milwaukee in the county of Milwaukee and State of Wisconsin in the presence of two witnesses.

WILLIAM S. HARLEY.

Witnesses:
 EDWIN F. CASPER,
 E. J. MUELLER.

---

Copies of this patent may be obtained for five cents each, by addressing the "Commissioner of Patents, Washington, D. C."